(12) United States Patent
Ruckriegel

(10) Patent No.: US 9,457,693 B2
(45) Date of Patent: Oct. 4, 2016

(54) SUPPORTING DEVICE FOR A SEAT AND VEHICLE SEAT EQUIPPED THEREWITH

(71) Applicant: Johnson Controls GmbH, Burscheid (DE)

(72) Inventor: Thomas Ruckriegel, Geraberg (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 14/416,946

(22) PCT Filed: Jul. 22, 2013

(86) PCT No.: PCT/EP2013/002167
§ 371 (c)(1),
(2) Date: Jan. 23, 2015

(87) PCT Pub. No.: WO2014/015971
PCT Pub. Date: Jan. 30, 2014

(65) Prior Publication Data
US 2015/0210190 A1   Jul. 30, 2015

(30) Foreign Application Priority Data

Jul. 25, 2012 (DE) .................. 10 2012 014 667

(51) Int. Cl.
*B60N 2/427* (2006.01)
*B60N 2/72* (2006.01)
*B60N 2/42* (2006.01)

(52) U.S. Cl.
CPC ......... *B60N 2/42709* (2013.01); *B60N 2/4228* (2013.01); *B60N 2/72* (2013.01)

(58) Field of Classification Search
USPC .............. 297/216.1, 216.13, 216.14, 452.15; 248/548
See application file for complete search history.

(56) References Cited

U.S. PATENT DOCUMENTS

| | | | | |
|---|---|---|---|---|
| 3,967,852 A | * | 7/1976 | Eiselt et al. | 297/452.49 |
| 5,054,845 A | * | 10/1991 | Vogel | 297/216.14 |
| 5,669,661 A | * | 9/1997 | Pajon | 297/216.13 |
| 5,746,476 A | * | 5/1998 | Novak et al. | 297/216.13 |
| 5,772,280 A | * | 6/1998 | Massara | 297/216.12 |
| 6,375,262 B1 | * | 4/2002 | Watanabe | 297/284.4 |
| 7,677,659 B2 | * | 3/2010 | Humer et al. | 297/216.14 |

(Continued)

FOREIGN PATENT DOCUMENTS

| | | |
|---|---|---|
| DE | 44 21 946 A1 | 6/1995 |
| DE | 102005002681 A1 | 7/2006 |
| JP | 2007-038810 A | 2/2007 |
| WO | WO-2009/012844 A1 | 1/2009 |
| WO | WO-2012/066275 A1 | 5/2012 |

OTHER PUBLICATIONS

German Examination Report in priority application No. 10 2012 014 667.1 dated Jun. 5, 2013, 2 pages.
International Search Report in PCT/EP2013/002167 dated Nov. 15, 2013, 6 pages.

*Primary Examiner* — Bradley Duckworth
(74) *Attorney, Agent, or Firm* — Foley & Lardner LLP

(57) ABSTRACT

A supporting device for a seat, in particular a vehicle seat, has at least one planar supporting part and a plurality of fastening structures arranged on the supporting part. The supporting part has at least one region of extent for an extent in at least one direction in the surface plane of the supporting part. The supporting part is of planar design and has web-like surface sections. The at least one region of extent is designed as a predetermined separating point in at least one web-like surface region.

10 Claims, 2 Drawing Sheets

(56) References Cited

U.S. PATENT DOCUMENTS

Figure 3:
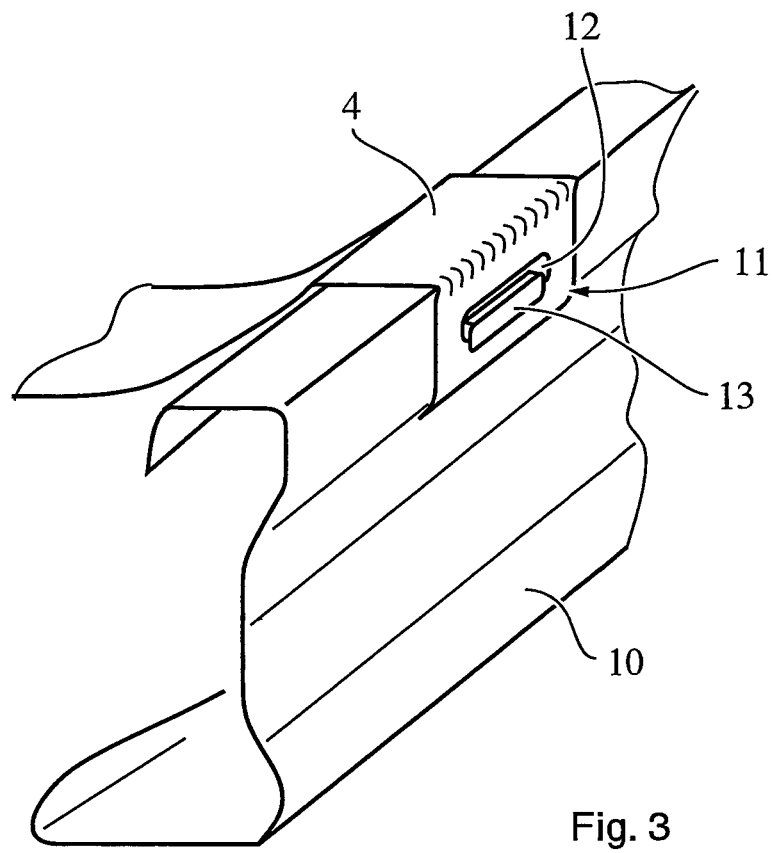

| | | |
|---|---|---|
| 8,998,316 B2 * | 4/2015 | Naughton et al. ....... 297/216.13 |
| 2008/0185884 A1 | 8/2008 | Hansen |
| 2011/0043008 A1 | 2/2011 | Reel |
| 2013/0134749 A1 * | 5/2013 | Awata et al. ............ 297/216.13 |
| 2013/0229038 A1 * | 9/2013 | Marshall .................... 297/216.1 |

* cited by examiner

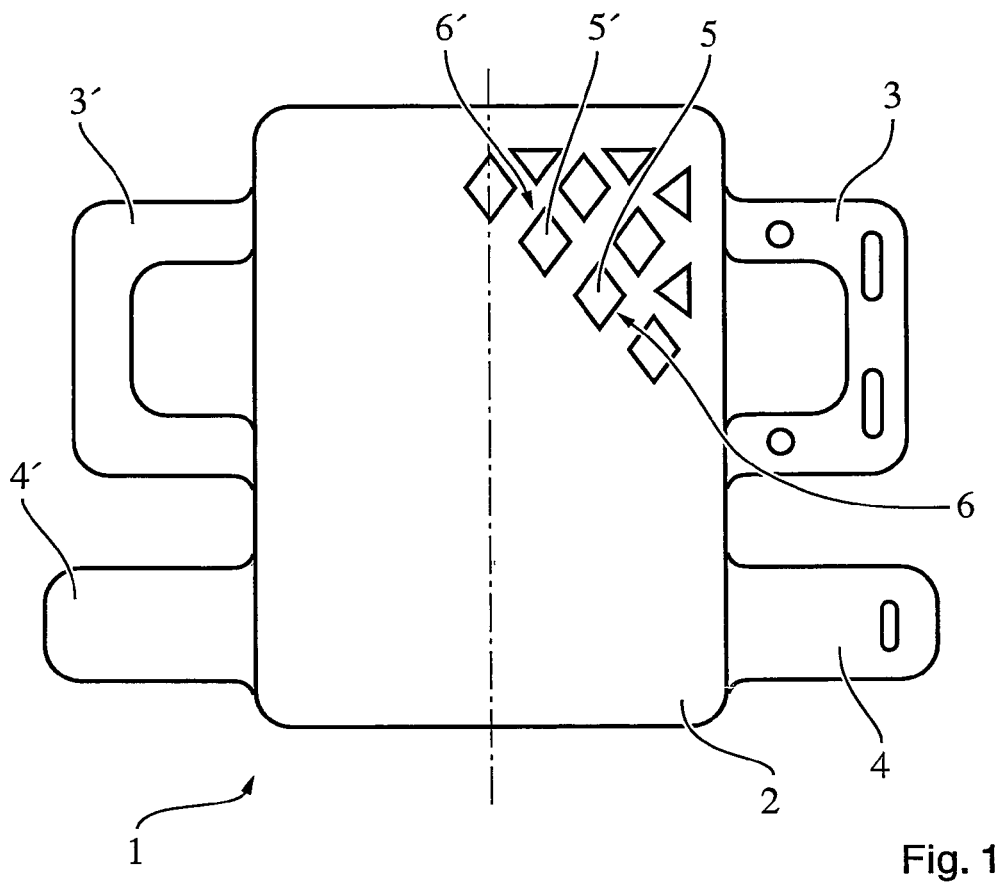
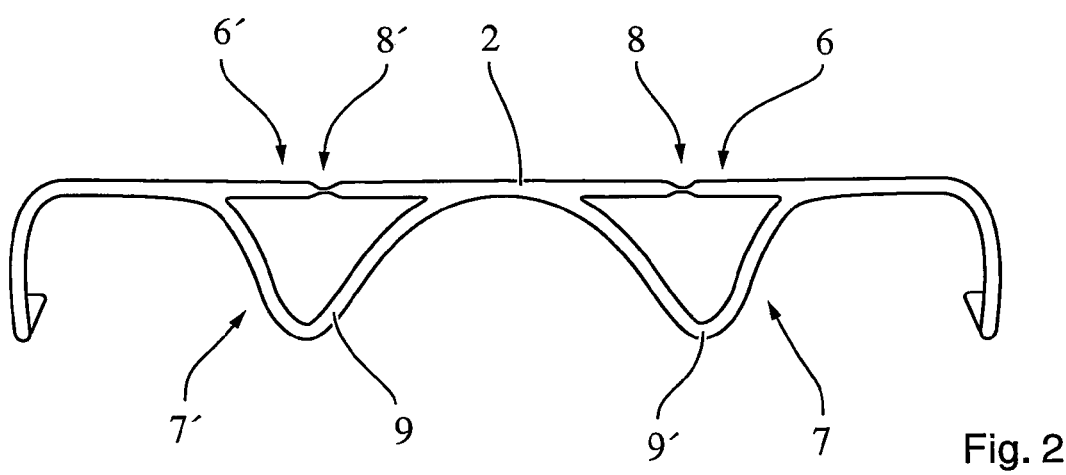
Fig. 1
Fig. 2

SUPPORTING DEVICE FOR A SEAT AND VEHICLE SEAT EQUIPPED THEREWITH

CROSS REFERENCE TO RELATED APPLICATIONS

The present application is a U.S. National Stage of International Application No. PCT/EP2013/002167 filed on Jul. 22, 2013, which claims the benefit of German Patent Application No. 10 2012 014 667.1 filed on Jul. 25, 2012, the entire disclosures of all of which are incorporated herein by reference.

The invention relates to a supporting device for a seat, in particular a vehicle seat, comprising at least one planar supporting part and a plurality of fastening means arranged on the supporting part, wherein the supporting part has at least one region of extent for an extent in at least one direction in the surface plane of the supporting part.

Supporting devices are known, which come into use for example on seat cushion- or backrest rear suspensions of vehicle seats and by means of which a seat- or backrest upholstery is supported from the underside or respectively rear side. The supporting devices which are used in particular on the seat cushions and backrests of a vehicle seat have a substantial influence here on the spring effect of the seat, both during the normal driving situations and also in possibly occurring cases of extreme stress, such as for example a rear end collision of the vehicle.

According to WO 2009/012844A1 such a supporting device is known which has at least one planar supporting part, by means of which the seat- or backrest upholstery is supported from the underside or respectively rear side. Usually, a plurality of fastening means are arranged on the supporting part, via which a connection of the supporting part with a framework of the seat part is produced. The fastening means are generally designed as connecting wires, which are fitted by their ends respectively into predetermined mounts on the framework of the seat- or backrest part. The support part is equipped with regions of extent for an extent in at least one direction in the surface plane of the supporting part, in order in particular in normal driving situations and possible extreme stress situations to generally increase the spring effect of the supporting part itself. The known supporting device has, in this respect, corrugations projecting from the surface plane on its supporting part in predetermined surface regions, which in any case of stress permit an extension of the supporting part by a predetermined amount in the surface plane. The corrugations configured as region of extent on the supporting part are always stressed here permanently, which can possibly lead to a fatigue of the material in the region of extent and therefore, in relation to the long-term function, to a reduced supporting- and spring effect of the supporting device on the upholstery part.

A vehicle seat is known from JP 2007-038810 A1. The vehicle seat is constructed so as to be movable, so that in the case of a frontal impact the seat is moved forward and in so doing the front central part of the seat cushion becomes higher than the lateral right and left parts of the seat cushion.

From DE 10 2005 002 681 A1 a seat cushion of a vehicle seat is likewise known, in which a seat pan is present which carries an upholstery body made of foam. The seat pan has catching means which project into the upholstery body. Thereby, a forward slipping of the upholstery body on the seat pan in the case of intensive decelerations of the vehicle is avoided.

The invention is therefore based on the problem of improving a supporting device of the type designated above to the effect that an improved and, at the same time, operationally reliable long-term function is achieved.

The solution to the problem takes place according to the invention by a supporting device having the features of claim 1. Advantageous further developments and embodiments of the invention are indicated in claims 2 to 10.

In a supporting device for a seat, in particular a vehicle seat, comprising at least one planar supporting part and a plurality of fastening means arranged on the supporting part, wherein the supporting part has at least one region of extent for an extent in at least one direction in the surface plane of the supporting part, it is provided according to the invention that the supporting part which is of planar design has web-like surface sections, and that the at least one region of extent is designed as a predetermined separating point in at least one web-like surface region.

By means of a region of extent designed as a predetermined separating point, an advantageously operationally reliable long-term function of the supporting part and therefore of the entire supporting device beneath a seat upholstery or respectively behind a backrest upholstery can be ensured. The predetermined separating point is preferably formed here in a web-like surface region of the supporting part, over which basically already an advantageous spring effect is brought about on the supporting part. The predetermined separating point in the supporting part is dimensioned such that the usual forces and stresses occurring during general driving situations can be absorbed without difficulty. Over the at least one predetermined separating point, for example, forces of somewhat more than 1000 Newtons can be absorbed, distributed over the surface of the seat part. The predetermined separating point only yields if, in for example an extraordinary case of stress, such as a rear end collision or such like, the active forces increase above a predetermined value of approximately 1500 to 1600 Newtons. An occupant situated on the seat thereby receives in his back region a greater freedom of movement, in particular perpendicularly to the plane of the supporting part, whereby the distance of his head from the headrest of the seat is automatically reduced. The predetermined separating point is formed in particular in a web-like surface region, which can extend in any desired direction in the surface plane of the supporting part.

Preferably, the supporting part has a plurality of predetermined separating points in predetermined web-like surface sections. The surface sections with their predetermined separating points can have here a predetermined arrangement distributed over the surface region of the supporting part, wherein a targeted or respectively directed extent of the supporting part is provided in at least one direction in the surface plane of the supporting part. In this connection it is conceivable, for example, that the predetermined separating points are formed specifically in the web-like surface sections of the supporting part, which have their preferred alignment in the direction of at least one of the main axes of the supporting part. In the case of an overload and the yielding, connected therewith, of the predetermined separating points on the supporting part, the supporting part, having in particular approximately a rectangular shape, then extends into one of its main axes. The frequently likewise web-like surface regions which are still remaining intact are possibly stressed excessively, so that an intensively elastic or plastic deformation occurs thereon, and thereby an increased spring effect occurs perpendicularly to the surface plane of the supporting part. The predetermined separating points in the supporting part can be arranged or respectively designed here such that starting from a particular extent of the stress even the complete dividing of the supporting part into at least two surface parts can occur.

An extent delimiter is associated with at least one web-like surface section with a predetermined separating point, which extent delimiter is connected on both sides of the predetermined separating point with the respective surface section of the supporting part. The use of an extent delimiter prevents in particular an excessive extending of the supporting part and therefore counteracts a complete failure of the supporting device. With a supporting device constructed according to the invention in such a manner, the maximum possible extent of the supporting part is effectively limited, so that advantageously a constantly secure hold of an occupant via for example a backrest part of a seat is ensured. The extent delimiter can be, inter alia, a flexible fibre structure arranged in the region of the predetermined separating point. With an intact predetermined separating point, the fibre structure forms a loosely formed loop on a surface of the supporting part.

The extent delimiter is preferably a section of a corrugation protruding from the surface plane of the supporting part, which in particular is a fixed component of the supporting part. With the construction of a corrugation section protruding from the surface plane of the supporting part, a structurally advantageous possibility is created for the construction of an extent delimiter. Such a corrugation section preferably has a curved or respectively arched course and has similarly flexible characteristics to the approximately flat surface structure of the supporting part. Thereby, specifically after the failure of the predetermined separating point, an advantageous yielding of the extent delimiter and hence an extending of the supporting part in at least one direction in the surface plane is made possible. Each corrugation section is formed securely and in particular in one piece with the principally flat surface structure of the supporting part.

The supporting part has apertures, penetrating in particular its surface plane, wherein by means of two apertures adjacent to one another at least one of the web-like surface sections of the supporting part is formed. By means of the apertures, penetrating the supporting part in particular perpendicularly, an advantageous possibility is ensured of the configuration of the web-like surface sections between the adjacent apertures in the flat surface structure of the supporting part. As a function of the number or respectively of the dimensions of a respective aperture, likewise the number and the configuration of the web-like surface sections is determined. Thereby, advantageously, in addition the spring effect of the supporting part can be influenced. The apertures preferably have a rhombic or elliptical shape, by means of which a supporting part structure can be produced, which has an advantageously uniform spring effect over the entire surface plane of the supporting part.

According to a further development of the invention, provision is made that the fastening means of the supporting device, by means of which the supporting device is connected with a frame or framework of a seat, are constructed in one piece with the supporting part. Preferably, the fastening means are formed from the same material as the supporting part, which simplifies the production of the supporting device according to the invention in an advantageous manner. The fastening means, preferably being applied directly on the surface structure of the supporting part, are constructed for example as holding or anchoring arms. The fastening means extend here directly in the surface plane of the supporting part from the periphery thereof, in particular at right angles to the marginal edge of the supporting part, outwards. However, it is likewise conceivable, instead of the fastening means formed in one piece with the supporting part, to provide separate connecting- or anchoring wires, which are connected via corresponding mounts with the rear side of the supporting part.

Preferably, the fastening means are arranged on opposite longitudinal edges of the supporting part, whereby a fixed and, at the same time, secure connection to the frame or respectively framework of a seat part is created. The fastening means preferably extend only on two of the longitudinal edges, which lie opposite one another, of a supporting part which has for example approximately a rectangular shape. Through the fastening means, arranged for example as holding arms on only two sides of the supporting part, an optimum spring effect is always ensured, which in possible occurring extreme cases of stress is further improved by the additional extending of the supporting part resulting from the failure of the predetermined separating points.

The fastening means are equipped with locking parts for a form-fitting connection with a frame of a seat, whereby on the one hand a positionally accurate and on the other hand a secure connection with the frame can be produced. The fastening means can be constructed at its end for example in the manner of a clip or respectively hook and can embrace predetermined frame regions of the frame or can engage into mounts on the frame. In addition, at least one fastening means can be equipped with a perpendicularly projecting pin, which engages into for example a depression on the framework and by means of which a direct locking function is implemented. By means of such a locking function, for example, an advantageous fixing of the supporting device according to the invention vertically on the framework is possible. It is likewise conceivable that the fastening means have eye-like material openings in their outwardly extending holding arms, which are able to be brought into operative connection for example with hook parts projecting on the frame of the seat, forming a form-fitting connection. For this purpose, the fastening means can have, for example, elastic characteristics for a deformability, whereby the fastening means can be adapted or respectively applied to predetermined contours of the framework.

The material for the supporting part and the fastening means, formed in particular in one piece thereon, is a homogeneous plastic, the use of which has proved successful for the formation at least of the supporting part. Polyethylene, polypropylene or similar comes into use for example as the plastic. The plastic which is used has the advantage, furthermore, that it enables accordingly elastic characteristics for the implementation for example of the basic spring effect and the additional flexibility of the regions of extent. In addition, the material which is used is distinguished by its advantageous corrosion resistance.

A further aspect of the invention relates to a seat, in particular a vehicle seat, with at least one seat cushion and a backrest part, wherein at least the seat cushion or the backrest part are equipped respectively with at least one upholstery part and a supporting device supporting the upholstery part according to one of the preceding claims.

By means of a supporting device constructed in such a way according to the invention, an advantageously improved flexibility of the supporting device is ensured in extreme cases of stress, such as for example a rear end collision on a vehicle. Thereby, in particular, an increased freedom of movement is produced for an occupant situated on the seat in the direction of the backrest part of the seat, so that the distance between the head and the headrest is automatically reduced. The fastening means constructed on the supporting device allow themselves to be deformed by a predetermined extent for an advantageously simple fastening of the supporting device on the frame or respectively framework of a seat cushion or backrest part. A respective fastening means can be equipped for example with a material opening, whereby regions of the fastening means engage behind projections on the frame or respectively framework which project in a hook-like manner on the frame surface.

An example embodiment of the supporting device according to the invention, from which further inventive features emerge, is illustrated in the drawings. There are shown:

FIG. 1: a view of the supporting device according to the invention;

FIG. 2: a view of the supporting device according to FIG. 1 in section;

FIG. 3: a perspective view of a fastening point on the frame of a seat, and

Figure 4:
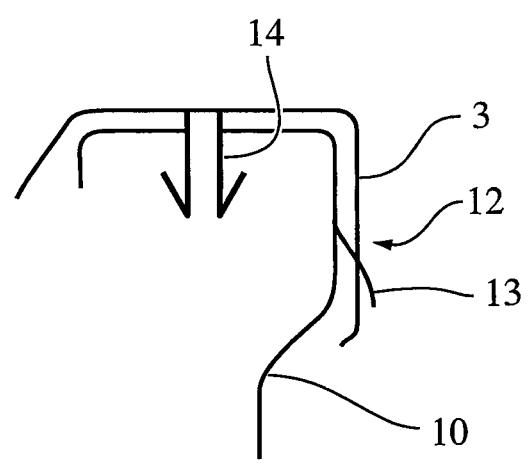

FIG. 4: a view of a further fastening point on the frame.

1 designates a supporting device which has a supporting part 2 and fastening means 3, 3', 4, 4' arranged on the supporting part 2. The supporting part 2 and the fastening means arranged thereon are formed in one piece from a plastic material. The supporting part 2 has a plurality of apertures 5, 5' penetrating its surface plane perpendicularly, wherein web-like surface sections 6, 6' are produced between two apertures which are adjacent to one another. In the example embodiment which is shown, the apertures 5, 5' have a rhombic shape, but can have any other desired shape, such as for example an elliptical shape. Predetermined surface sections 6, 6', running between the apertures, which surface sections run in the surface plane of the supporting part, have a region of extent 7, 7'. Each region of extent 7, 7' is equipped with a predetermined separating point 8, 8' (FIG. 2). In extreme cases of stress occurring, such as for example a rear end impact on a vehicle, the predetermined separating points 8, 8' fail, whereby an extent or respectively extending of the supporting part is brought about in at least one direction in its surface plane.

As FIG. 2 shows, an extent delimiter 9, 9' projecting in sections on the preferably flat surface structure of the supporting part 2 is associated with each predetermined separating point 8, 8', the ends of which extent delimiter are connected with the supporting part on both sides of the predetermined separating point. Each extent delimiter is formed as a section of a corrugation, protruding in a curved shape on the surface structure, beneath a respective predetermined separating point. In FIG. 2 the fastening means 3, 3', arranged on two sides of the supporting part 2, are arranged in an angled manner.

In FIG. 3 a section of a frame 10 of a seat, not illustrated in further detail, is illustrated, on which the fastening means 4, constructed as a holding arm, is fastened via a form-fitting connection 11 with the section of the frame 10. To form the form-fitting connection 11, the fastening means 4 has a locking part configured as a material opening 12, which is brought into a retaining operative connection with a hook-like projection 13 on the outer side of the frame 10. The fastening means 4, formed in one piece with the supporting part 2, is deformable and can therefore be placed around predetermined surface regions of the frame 10.

As FIG. 4 shows, in addition to a material opening 12, at least one of the fastening means 3, 3', 4, 4' can be equipped with a pin 14 projecting perpendicularly on the fastening means 3, which pin engages into a bore on the frame 10 and via this an advantageous alignment of the supporting device 1 in its height on the frame 10 is possible.

LIST OF REFERENCE NUMBERS 1 supporting device
2 supporting part
3,3' fastening means
4,4' fastening means
5,5' aperture
6,6' surface section
7,7' region of extent
8,8' predetermined separating points
9,9' extent delimiter
10 frame
11 form-fitting connection
12 material opening
13 projection
14 pin

The invention claimed is:

1. A supporting device for a seat, comprising:
    at least one planar supporting part with a top surface that defines a surface plane of the planar supporting part,
    wherein the planar supporting part includes apertures that extend through the planar supporting part substantially perpendicular to the surface plane; and
    a plurality of fastening structures arranged on the planar supporting part,
    wherein the planar supporting part has at least one region of extent configured to allow the planar supporting part to extend in at least one direction parallel to the surface plane of the planar supporting part,
    wherein the planar supporting part has surface sections that are formed by two of the apertures adjacent to one another such that each of the surface sections is positioned between two of the apertures, wherein the surface sections form a web-like structure, wherein the surface sections extend along and are parallel to the surface plane, and
    wherein each region of extent is positioned in one of the surface sections such that the region of extent extends parallel to the surface plane,
    wherein each region of extent is integrally formed as one piece with the planar supporting part and a corresponding one of the surface sections of the planar supporting part,
    wherein each region of extent has a predetermined separating point, wherein each separating point extends between two of the apertures and is positioned between a first part of the one of the surface sections and a second part of the one of the surface sections,
    wherein, when force acting on one of the surface sections is below a predetermined value, the first part of the one of the surface sections and the second part of the one of the surface sections are connected together through the respective separating point,
    wherein, when the force acting on the one of the surface sections exceeds a predetermined value, the respective separating point fails such that the first part and the second part of the one of the surface sections are not connected to each other through the respective separating point.

2. The supporting device according to claim 1, wherein the planar supporting part has a plurality of regions of extent.

3. The supporting device according to claim 1, further comprising at least one extent delimiter, wherein opposite ends of each extent delimiter are connected with the planar supporting part on both sides of the predetermined separating point such that the extent delimiter is at least partially separate from the predetermined separating point, wherein the at least one extent delimiter is connected to at least one of the surface sections, wherein the at least one of the surface sections has one of the predetermined separating points.

4. The supporting device according to claim 3, wherein the extent delimiter is at least a portion of a corrugation, wherein the corrugation is arranged on the planar supporting part and is integrally formed with the planar supporting part, wherein the corrugation projects from the surface plane of the planar supporting part.

5. The support device according to claim 3, wherein, when the force acting on the one of the surface sections exceeds the predetermined value and the respective separating point fails, the first part and the second part of the one of the surface sections remain connected to each other through the respective extent delimiter.

6. The supporting device according to claim 1, wherein the fastening structures are integrally formed with the planar supporting part.

7. The supporting device according to claim 1, wherein the fastening structures are arranged on opposite longitudinal edges of the planar supporting part.

8. The supporting device according to claim 1, wherein the fastening structures have locking parts, wherein the supporting device can be fastened to the seat frame via a positive connection of the fastening structures with the seat frame.

9. The supporting device according to claim 1, wherein the material for the planar supporting part is a homogeneous plastic.

10. The support device according to claim 1, wherein the separating point is severed when the separating point fails.

* * * * *